Aug. 19, 1969 YOSHIHISA KATSUYAMA 3,461,782
MECHANISM FOR AUTOMATICALLY ADJUSTING THE FILM SENSITIVITY
SETTING FOR AN EXPOSURE METER
BUILT INTO A CAMERA
Filed March 23, 1966

3,461,782
MECHANISM FOR AUTOMATICALLY ADJUSTING THE FILM SENSITIVITY SETTING FOR AN EXPOSURE METER BUILT INTO A CAMERA
Yoshihisa Katsuyama, Yokohama-shi, Japan, assignor to Nippon Kogaku, K.K., Tokyo, Japan, a corporation of Japan
Filed Mar. 23, 1966, Ser. No. 536,801
Int. Cl. G01j 1/00; G03b 23/02
U.S. Cl. 95—10                                    5 Claims

ABSTRACT OF THE DISCLOSURE

A mechanism to automatically adjust the film sensitivity setting for an exposure meter built into a motion picture camera, the adjustment being by a one-step motion at a time when a film cartridge is loaded into the camera. The adjustment of the film sensitivity setting is performed by a spring loaded rack member which is released only after the camera cover has been locked by rotation of a locking member by the operator of the camera.

---

This invention relates to miniature movie camera and more particularly to a mechanism for automatically adjusting the film sensitivity setting of a built-in exposure meter where film loading is carried out with use of cartridge.

In accordance with the present invention, it is provided that a movie camera adapted for cartridge type film loading has a mechanism for automatically adjusting the exposure meter by means of a signal member representative of the sensitivity of the film to be loaded on the film cartridge and that the signal member of the cartridge with the associating member of the exposure correction mechanism side is inter-locked in action with the lockup action of the cover of the film chamber.

In accordance with the present invention, the automatic film sensitivity adjustment is readily achieved with the necessary lockup of the cover of the film chamber.

For an understanding of the principles and features of the present invention, reference is made to the following description of a typical embodiment as illustrated in the accompanying drawing, in which.

Figure 1:
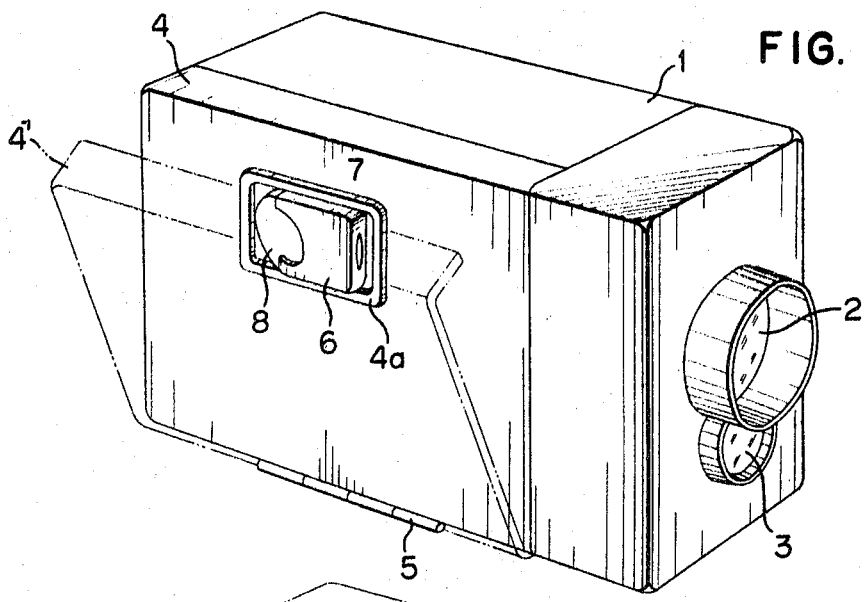
FIG. 1 is a perspective view of a miniature movie camera, representing one embodiment of the invention.

Referring to the drawing, a camera body with a built-in exposure meter is represented by the reference character 1 and includes an objective lens 2, a light receiving lens 3, a cover 4 for the film chamber, the cover 4 being hinged to the camera by a hinge 5. A knob 6 for the locking assembly is liftably supported by a pin 7, the knob 6 being partially positioned within a recessed frame 4a formed in the cover 4. A shaft 8 supports the locking assembly and is provided with a key disc 9 integral therewith, the key disc having a recess 9a extending radially inwardly from its periphery, and an arcuate slot 9b. The recess 9a has a width somewhat larger than the width of an overhang part 1a of body 1 so that when key disc 9, is rotated in the clockwise direction, it engages with overhang part 1a to lockup cover 4. A spring plate 10 controls the uplifting of knob 6 and furnishes friction to key disc 9 in rotation, the frictional force being predetermined that key disc 9 acts against the energy of spring 13 as explained hereinafter. A lever 11 supported rotatably on pin 12 secured to the inner side of cover 4, is urged to turn clockwise by spring 13, one end thereof being fixed to cover 4 and the other end thereof being fixed to lever 11, the end portion 11a of which lever being formed to be contacted with an interlocking arm 20a hereinafter described. A pin 14 is fixed at the center portion of lever 11 and is freely movable within arcuate slot 9b. When cover 4 is open (FIG. 2), pin 14 is moved upward by the lower edge of arcuate slot 9b so as to place the end portion 11a of lever 11 at its highest position (FIG. 2) above interlocking arm 20a. A film cartridge 18, including the film is provided with a portion 15a that defines a signal member having a signal represented by the height $l$ measured from the bottom surface of the cartridge, the height $l$ being varied as film sensitivity varies. A plurality of cartridges having different signal members is provided in accordance with the kinds of film sensitivity. The location of signal member 15a is determined from a portion common to every cartridge and the location of the member 15a is such that it will contact with interlocking arm 20a when the cartridge is loaded within the film chamber. It is, however, to be noted that the maximum and the minimum height $l$ of signal is limited within the range such that interlocking arm 20a can be inserted within signal member 15a. Photoresistive body 16 is arranged on the optical axis of lens 3 and constitutes the light receiving portion of the conventional exposure meter circuit not shown in order to avoid complicating the drawing. There is provided a barrel 17 containing a portion of lens 2, and an adjusting gear 18 rotatably fitted within barrel 17. A filter 19 adjusts the exposure meter in accordance with the sensitivity of the film to be used, and is secured to the surface of the gear 18, filter 19 being preset in a specified transparency so as to vary the illuminance for photoresistive body 16 at a prescribed rate with the displacement made in the arrow direction in FIG. 2 of sector 19a which moves across the impinging light path. Rack 20 meshes with adjusting gear 18 and is guided by guide shaft 21 to move up and down. Interlocking arm 20a projects sidewise from rack 20 to enter into signal member 15a of cartridge 15 so as to transmit the signal $l$ to filter 19 when lever 11 rotates; compression spring 22 is positioned about the shaft 21 and acts to urge rack 20 to the position shown in FIG. 2.

Figure 2:
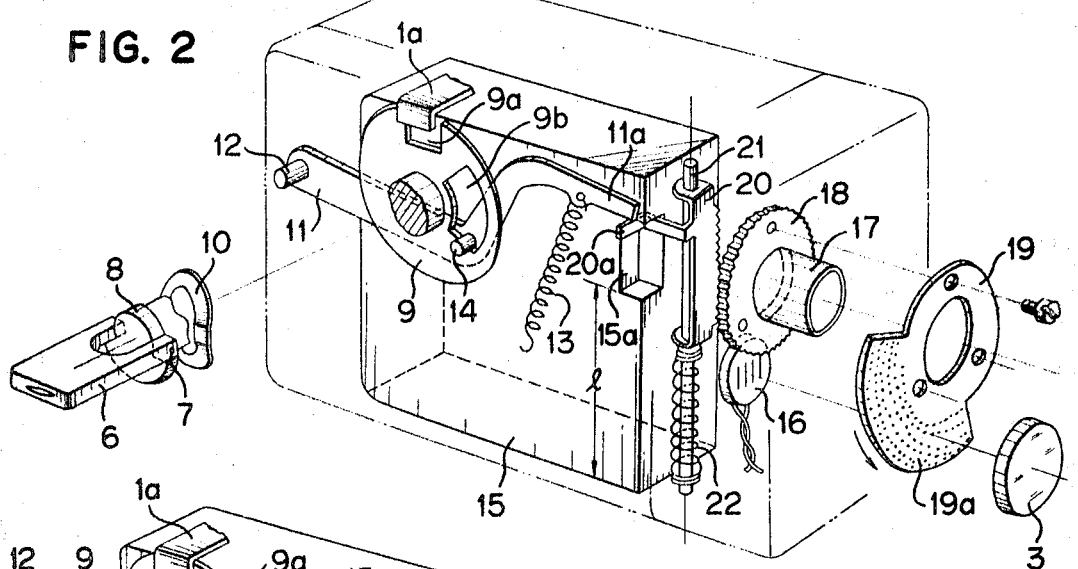
FIG. 2 is a perspective view of the mechanism for adjusting the film sensitivity setting.
Figure 3:
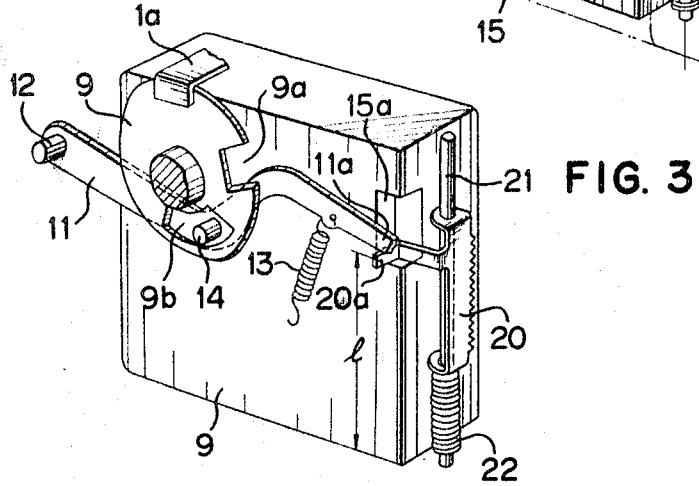
FIG. 3 shows the structure of FIG. 2 in another position.

With such a structure as above described, when cartridge 15 is loaded in a prescribed position of the film chamber, when recess 9a of key disc 9 is engaged with overhang part 1a of the camera body and when cover 4 is closed, end 11a of lever 11 comes to lie on the top of interlocking arm 20a as illustrated in FIG. 2. Consequently, when key disc 9 is rotated clockwise by means of knob 6, cover 4 is locked up for engagement of key disc 9 with overhang part 1a. However since arcuate slot 9b rotates simultaneously, lever 11 rotates clockwise by the action spring 13, and in addition, because of the relative position of end 11a of lever 11 lying in contact with interlocking arm 20a, rack 20 descends to reach the signal height $l$ of loaded cartridge 15 so as to transmit the displacement to adjusting gear 18, which in turn, moves adjusting filter 19 an amount corresponding to said signal amount to adjust the exposure meter.

It follows therefore that the automatic film sensitivity adjustment may be achieved in interlocking with the necessary lockup of cover 4 in the loading of the cartridge by calculating the film sensitivity concerned and the corresponding correction amount for the exposure meter, determining the signal height for the cartridge, and presetting the relationship between the rotation amount of key disc 9 necessary for lockup and the interlocked movement range of lever 11.

The shape of the signalling portion is not limited to the illustrated embodiment of the invention, but any other modifications, which would provide mechanical displacement, for example, a pin, projection or gear, etc. will do.

The invention is not limited to the illustrative embodiment, but is limited by the scope defined in the claims.

What is claimed is:

1. In a movie camera adapted for cartridge type film loading and automatic adjustment of the exposure by means of a signal portion of the cartridge representative of the sensitivity of the photographic film in the cartridge, the combination comprising:
   a camera housing having covering means movable to the open position for loading said cartridge into the camera and to the closed position for retaining said cartridge in said housing;
   locking means movable to a locked position in which said covering means is held in said closed position and to a released position in which said covering means can be opened;
   means for retaining said locking means in said locked position and in said released position thereof;
   a signal sensing member in the camera movable between a first location and a second location;
   a first spring for moving said signal sensing member in a first direction along a path from said second location to said first location;
   coupling means on said covering means operably engaging with said signal sensing member when said covering means is placed in the closed position thereof;
   a second spring acting on said coupling means in response to the movement of said locking means for moving said signal sensing member in an opposite second direction along said path;
   an exposure control element adjustable in accordance with the signal portion of the cartridge;
   and means connecting said exposure control element to said signal sensing member for moving said exposure control element in response to movement of said signal sensing member toward said second location;
   said signal sensing member being moved toward said second location against said first spring by said coupling means which is moved by said second spring in response to the movement of said locking means to said locked position, said signal sensing member being arrested by said signal portion of the cartridge during said movement thereof and being retracted along said path to said first location in response to the movement of said locking means to said open position by said first spring.

2. In a movie camera as claimed in claim 1 wherein said locking means includes an operating knob, a rotatable shaft supporting said knob and a rotatable disk integral with said shaft, said disk having a peripheral radially extending recess and an arcuate slot, said recess moving an over hang part of said camera housing when said covering means is moved between said open position and said close position and said arcuate slot being engageable with said coupling means when said locking means moves to said locked position.

3. In a movie camera as claimed in claim 2 further including retaining means defined by a spring plate in frictional engagement with said disc, said knob being hinged on said shaft.

4. In a movie camera as claimed in claim 3 further including a recessed frame formed in the surface of said covering means wherein said knob is partially in said recessed frame.

5. In a movie camera as recited in claim 1 wherein said exposure control element is a filter placed in front of a photoelectric element for transmitting the light of scene to be photographed, said filter being movable in cooperation with said sensing means for adjusting the exposure.

References Cited
UNITED STATES PATENTS

| | | | |
|---|---|---|---|
| 2,043,901 | 6/1936 | Mihalyi | 352—141 |
| 3,083,626 | 4/1963 | Nerwin | 95—31 XR |
| 3,266,397 | 8/1966 | Kremp et al. | |
| 3,266,398 | 8/1966 | Kremp et al. | |
| 3,364,831 | 1/1968 | Kremp et al. | 95—31 |
| 3,368,467 | 2/1968 | Hahn | 95—31 XR |

NORTON ANSHER, Primary Examiner

JOSEPH F. PETERS, Jr., Assistant Examiner

U.S. Cl. X.R.

352—72